United States Patent [19]

Lee

[11] Patent Number: 5,878,456
[45] Date of Patent: Mar. 9, 1999

[54] METHOD OF WASHING A BLANKET IN A WASHING MACHINE

[75] Inventor: Jae-Yoll Lee, Incheon, Rep. of Korea

[73] Assignee: Daewoo Electronics Co., Ltd., Rep. of Korea

[21] Appl. No.: 74,646

[22] Filed: May 8, 1998

[30] Foreign Application Priority Data

May 8, 1997 [KR] Rep. of Korea .................. 1997 17606

[51] Int. Cl.⁶ .................................................. D06F 33/02
[52] U.S. Cl. ............................................. 8/159; 68/12.04
[58] Field of Search .............................. 68/133, 134, 53, 68/12.04, 12.05; 8/158, 159

[56] References Cited

U.S. PATENT DOCUMENTS

| | | |
|---|---|---|
| 5,167,722 | 12/1992 | Pastryk et al. . |
| 5,275,025 | 1/1994 | Nakamura et al. ............... 68/12.04 |
| 5,297,307 | 3/1994 | Baek .................................. 68/12.04 |
| 5,560,061 | 10/1996 | Wentzlaff et al. .................... 8/159 |
| 5,606,877 | 3/1997 | Hishimoto . |
| 5,669,250 | 9/1997 | Dausch et al. ..................... 68/12.04 |
| 5,671,494 | 9/1997 | Civanelli et al. ...................... 8/159 |
| 5,682,634 | 11/1997 | Cheong et al. ........................ 8/159 |
| 5,692,259 | 12/1997 | Lee et al. .............................. 8/159 |
| 5,701,624 | 12/1997 | Shin et al. ......................... 68/12.04 |
| 5,720,064 | 2/1998 | Koo .................................. 68/12.04 |

*Primary Examiner*—Frankie L. Stinson
*Attorney, Agent, or Firm*—Pillsbury Madison & Sutro, LLP

[57] ABSTRACT

A method of washing a blanket in a washing machine. The method has the steps of determining a weight of a blanket in the spin tub, determining first and second water supply levels and washing and rinsing times, supplying washing water up to the first water supply level into the outer tub, carrying out a washing mode, carrying out a first draining mode, carrying out a first dehydrating mode for 2 minutes, repeating above washing cycle by the determined washing times, supplying a rinsing water up to the second water supply level which is lower than the first water supply level into the outer tub, carrying out a rinsing mode for 1 minute, carrying out a second draining mode, carrying out a second dehydrating mode for 3 minutes, and repeating above rinsing cycle by the determined rinsing times. The method improves a rinsing efficiency thereof and saves the rinsing water.

10 Claims, 5 Drawing Sheets

METHOD OF WASHING A BLANKET IN A WASHING MACHINE

BACKGROUND OF THE INVENTION

1. Field of the Invention

The present invention relates to a method of washing a blanket in a washing machine, and more particularly to a method of washing a blanket in a washing machine which can reduce a consumption of rinsing water and can improve a rinsing efficiency for a blanket.

2. Description of the Prior Art

As is well known, a washing machine is an appliance for separating dirts from laundry by sequentially carrying out various cycles in the order of feeding washing water, washing, rinsing, dehydrating, and draining.

While the above cycles are being executed, the dirts contained in the laundry are separated from the laundry by means of friction between a water flow and the laundry or by means of detergents. In particular, impurities such as foam or detergent that remain in the laundry after the washing cycle has finished are separated from the laundry and is drained out of the washing machine while the rinsing cycle is being executed.

Generally, the rinsing cycle is classified into a hold-water rinsing cycle and a spin dry rinsing cycle. In a conventional washing machine operating in its rinsing cycle, the so-called hold-water rinsing cycle, detergent wash water is discharged from an outer tub, after which the outer tub is filled by clean water. When the incoming new water reaches a predetermined level in the outer tub, the water supply is stopped and a pulsator installed at the center of a spin tub is rotated. Detergent permeated into the laundry is dissolved into the new water in the spin tub by the water which is stirred by the pulsator. After a predetermined time, the water solvable detergent is discharged from the outer tub. This process may be repeated one or more times. This hold-water rinsing cycle operation wastes a considerable amount of water when the discharge and filling are repeated.

Therefore, another type of rinsing cycle, the so-called spin dry rinsing cycle which reduces the consumption of water was developed. Spin dry rinsing cycle operation includes one or more spin dry rinsing modes. In each spin dry rinsing mode, there are a spin dry rinsing operation and a spin dry operation. In the spin dry rinsing operation, water in the outer tub is drained from the outer tub after the detergent washing, then new water is supplied into the outer tub while the spin tub is being rotated. The supplied water permeates into the laundry because of the spin tub rotation. After the spin dry rinsing operation is completed, the spin dry mode is started. During the spin dry operation, the water supply is stopped, but the rotation of the spin tub continues. The permeating water is separated from the laundry and is extracted by the centrifugal force of the spin tub rotation. The spin dry rinsing cycle, including the starting and stopping of water supply and spin tub rotation, is repeated a predetermined number of times in spin dry rinsing mode operation.

For example, U.S. Pat. No. 5,606,877 discloses a washing machine which automatically adjusts the water supply level according to the amount of the laundry and permits the user to select the spin dry rinsing times that will occur during the spin dry rinsing mode operation and the time period for the spin dry rinsing mode operation. In the above washing machine, after the washing cycle, the rinsing cycle is carried out through the spin dry rinsing operation and the spin dry operation. Since a proper amount of washing water is supplied according to the amount of the laundry and various operational parameters can be adjusted by the user, the consumption of the washing water can be reduced. However, while the spin dry rinsing operation is being carried out, the spin tub continuously rotates, so a power consumption thereof increases.

In particular, when the laundry is a blanket, it absorbs a relatively large amount of water. So, in the conventional rinsing method, after the washing cycle is finished, a relatively large amount of new rinsing water must be supplied and drained plural times, resulting in a waste of the rinsing water. In addition, since the detergent deeply permeates into the blanket, a complete separation of the detergent is not easy.

To overcome the above-described disadvantages, various rinsing methods have been suggested, but they cannot completely solve the relied-upon disadvantages.

Meanwhile, U.S. Pat. No. 5,167,722 issued to Pastryk et al. discloses a spray rinsing process for removing dirt and the detergent contained in the laundry.

FIG. 4 shows a flowchart of Pastryk's spray rinsing process.

As shown in FIG. 4, the spray rinsing process includes a first step 510 of draining the washing water from a wash zone after the washing cycle has finished, a second step 520 of introducing a first washing water into the wash zone, a third step 530 of draining the first washing water collected in a sump area out of the washing machine, a fourth step 540 of introducing a second washing water into the wash zone through a spray nozzle and then circulating the second washing water 4 to 12 times, and a fifth step 550 of spinning a spin tub so as to drain the circulated washing water out of the washing machine.

In first step 510, the spin tub rotates at a predetermined speed so that the laundry loaded in the spin tub is forced toward the side wall of the spin tub by centrifugal force, thereby the washing water contained in the laundry discharges through a plurality of apertures formed in the side wall of the spin tub.

In second step 520, the spin tub continuously rotates and the first washing water is supplied and drained twice. In addition, the first washing water is supplied such that it fully contacts the laundry.

In third step 530, the spin tub continuously rotates in order to extract as much washing water as possible.

On the other hand, second and third steps 520 and 530 are repeated at least once.

In fourth step 540, similar to the second step 520, the second washing water is supplied such that it fully contacts the laundry. In addition, the second washing water circulates such that the cumulative amount of the circulated washing water is greater than the amount necessary to saturate the laundry.

However, in the Pastryk's spray rinsing process, the circulated washing water sprays onto the laundry through various circuits and nozzles as well, so it takes a long time to circulate the washing water and accordingly the spray rinsing process requires much time for rinsing the laundry.

In addition, since the washing machine instantly drains the first washing water out of the washing machine without recirculating the first washing water, the waste of the washing water still remains a problem in the Pastryk's spray rinsing process.

SUMMARY OF THE INVENTION

The present invention is intended to overcome the above-described disadvantages. Therefore, it is an object of the present invention to provide a method of washing a blanket in a washing machine which can save rinsing water and can improve a rinsing efficiency thereof.

In order to achieve the above object of the present invention, there is provided a method of washing a blanket in a washing machine having an outer tub for receiving washing water, a spin tub for receiving a laundry, a motor installed at an underside of the outer tub for generating a rotational force and transmitting the rotational force to a power transmission and a pulsator rotatably coupled to a rotating shaft of the power transmission, the method comprising:

(i) determining a weight of a blanket in the spin tub by rotating the pulsator by actuating the motor;
(ii) determining a first water supply level, a second water supply level, a washing times and a rinsing times according to the weight of the blanket;
(iii) supplying the washing water up to the first water supply level into the outer tub;
(iv) carrying out a washing mode when the washing water has been supplied up to the first water supply level into the outer tub;
(v) carrying out a first draining mode;
(vi) carrying out a first dehydrating mode for a first predetermined time period;
(vii) repeating steps (iv) to (vi) by the determined washing times;
(viii) supplying a rinsing water up to the second water supply level which is lower than the first water supply level into the outer tub;
(ix) carrying out a rinsing mode for a second predetermined time period by rotating the pulsator when the rinsing water has been supplied up to the second water supply level into the outer tub;
(x) carrying out a second draining mode;
(xi) carrying out a second dehydrating mode for a third predetermined time period; and (xii) repeating steps (viii) to (xi) by the determined rinsing times.

Step (i) comprises the substeps of (a) rotating the pulsator by actuating the motor by applying a predetermined power to the motor; (b) stopping the applying of the power to the motor after a fourth predetermined time period lapses; (c) detecting a time lapse of a free rotation of the pulsator by an inertia; and (d) evaluating the weight of the blanket according to the time lapse. According to a preferred embodiment of the present invention, the fourth predetermined time period is approximately 1 minute.

In steps (iv) and (ix), a level of water being supplied into the outer tub is detected by a water level detecting device which is installed at a predetermined position of a side wall of the outer tub and makes a U-shaped tube together with the outer tub, the water level detecting device sending an electric signal to a control section when a level of the washing water supplied in step (iii) reaches the first water supply level and when a level of the rinsing water supplied in step (viii) reaches the second water supply level.

According to a preferred embodiment of the present invention, the third predetermined time period is longer than the first predetermined time period, the first predetermined time period being approximately 2 minutes and the second predetermined time period being approximately 3 minutes.

Meanwhile, in step (ix), the second predetermined time period is approximately 1 minute.

When step (xii) is finished, a main dehydrating cycle starts.

In the method of washing a blanket in a washing machine according to the present invention, the amount of the rinsing water supplied during the rinsing cycle is smaller than the amount of the washing water supplied during the washing cycle and the rinsing mode is carried out for a relatively short time period while the dehydrating mode is carried out for a relatively long time period so that a contaminated water permeated into the blanket is effectively separated from the blanket, thereby improving a rinsing efficiency thereof and saving the rinsing water.

BRIEF DESCRIPTION OF THE DRAWINGS

The above object and other advantages of the present invention will become more apparent by describing in detail a preferred embodiment thereof with reference to the attached drawings in which.

DETAILED DESCRIPTION OF THE INVENTION

Hereinafter, a washing machine according to a preferred embodiment of the present invention will be explained in more detail with reference to the accompanying drawings.

Figure 1:
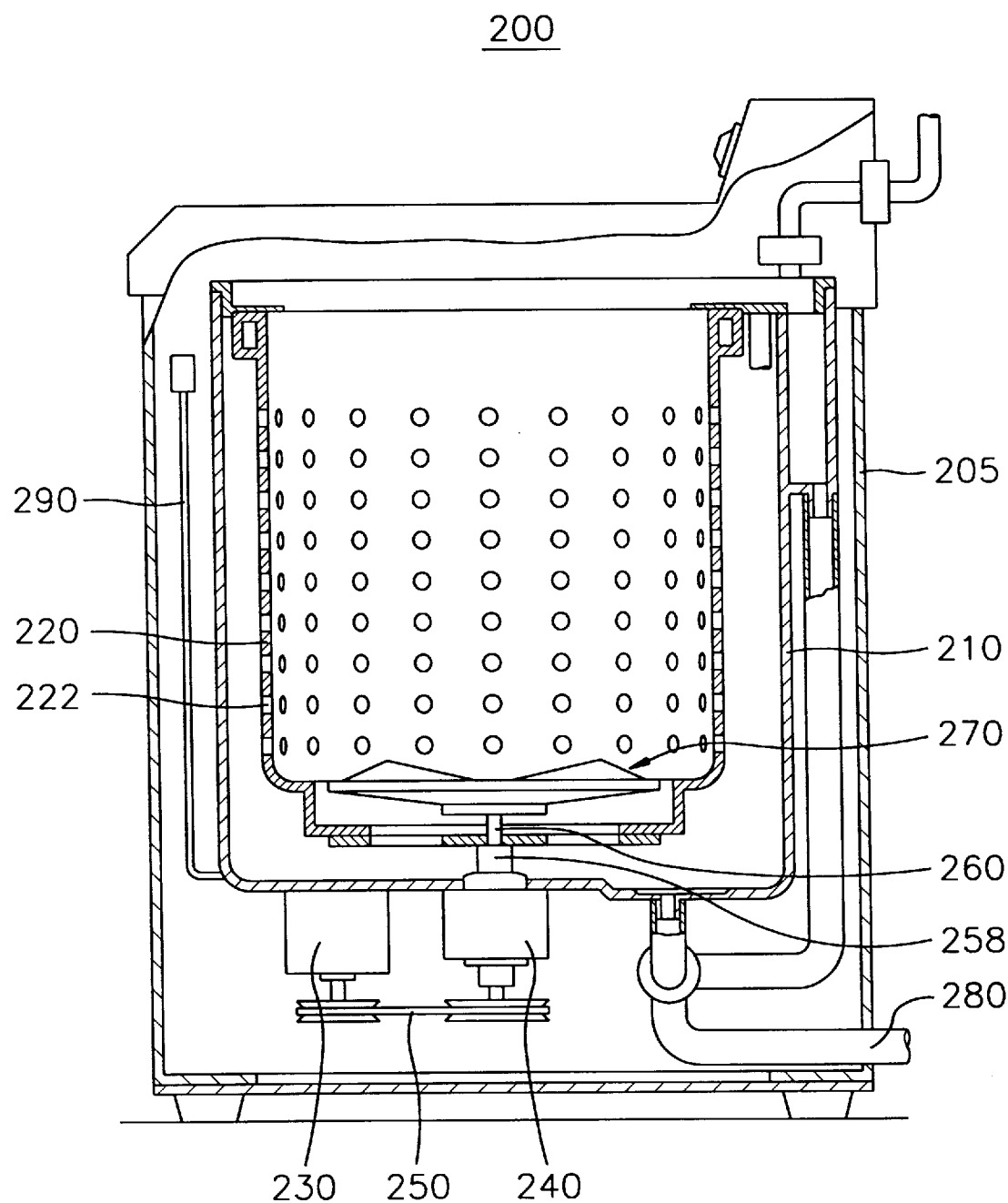
FIG. 1 is a cross-sectional view showing an inner structure of a washing machine according to a preferred embodiment of the present invention.

FIG. 1 shows a washing machine 200 according to a preferred embodiment of the present invention.

As shown in FIG. 1, washing machine 200 has a cabinet 205. An outer tub 210 is mounted inside of cabinet 205 for receiving washing water therein. A spin tub 220 is rotatably mounted on a lower portion of outer tub 210 for receiving a laundry therein. Spin tub 220 is formed at a side wall thereof with a plurality of apertures 222 so as to fluidly communicate with outer tub 210 therethrough.

A motor 230 is secured to a predetermined position of an underside of outer tub 210. A power transmission 240 is secured to a center position of the underside of outer tub 210 and is connected to motor 230 by a belt 250 for receiving a rotational force generated from motor 230 and outputting a reduced rotational speed. Spin tub 220 is coupled to a first rotating shaft 258 upwardly extending from power transmission 240 so as to rotate therewith while a dehydrating mode is being carried out. On the other hand, a second rotating shaft 260 which extends upwardly from power transmission 240 separately from first rotating shaft 258 penetrates through a bottom wall of spin tub 220 such that an upper portion of second rotating shaft 260 is protruded into spin tub 220 by a predetermined length. A pulsator 270 is coupled to an end portion of second rotating shaft 260 so that pulsator 270 rotates during washing and rinsing modes.

Meanwhile, a water draining pipe 280 is connected to a predetermined position at the underside of outer tub 210 so as to drain the water out of washing machine 200.

A water level detecting device 290 is connected to a predetermined position of an outer wall of outer tub 210 so as to form a U-shaped pipe together with outer tub 210 so that it detects a water level in outer tub 210 when the water is supplied thereinto.

Figure 2:
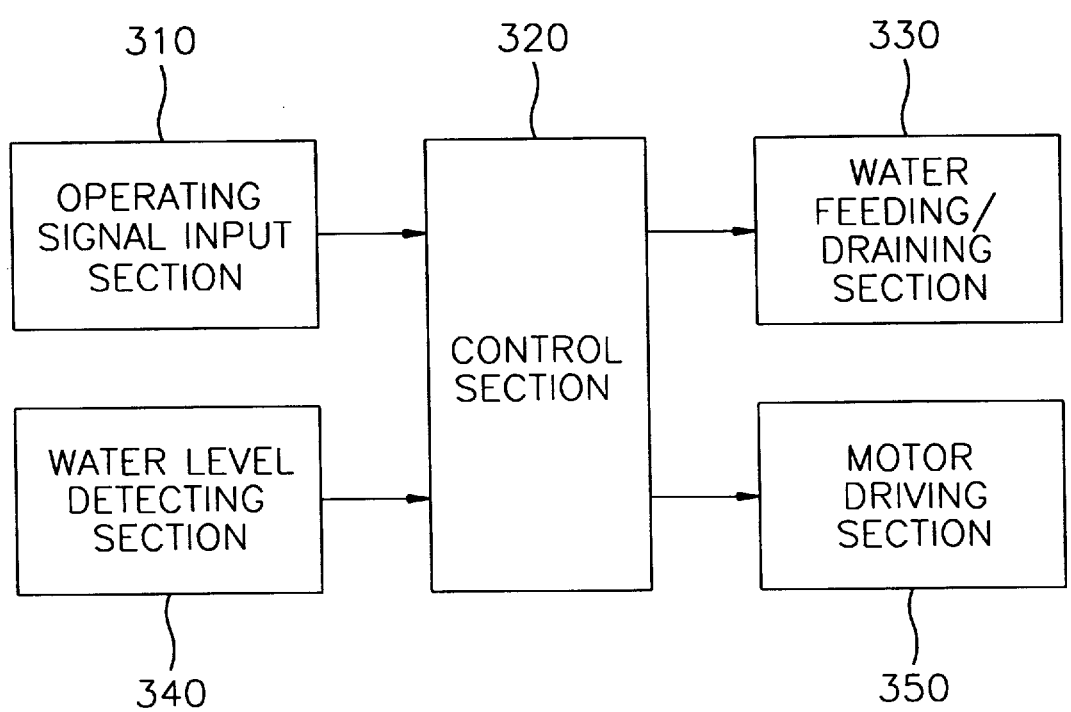
FIG. 2 is a block diagram illustrating a method of washing a blanket in a washing machine according to a preferred embodiment of the present invention.

Meanwhile, FIG. 2 shows a block diagram illustrating operational relationships between various sections of washing machine 200 of the present invention.

As shown in FIG. 2, washing machine 200 has an operating signal input section 310, a control section 320 which generates a control signal according to a predetermined algorithm upon receiving an operating signal from operating signal input section 310, a water feeding/draining section 330 for supplying the water into outer tub 210 as water feeding/draining signals are inputted from control section 320, a water level detecting section 340 which detects the water level in outer tub 210 and sends an electric signal to control section 320, and a motor driving section 350 which rotates spin tub 220 or pulsator 270 alternatively as a driving signal is inputted from control section 320.

Hereinafter, a method of washing a blanket in washing machine 200 of the present invention will be described in detail with reference to the accompanying drawings.

Figure 3A:
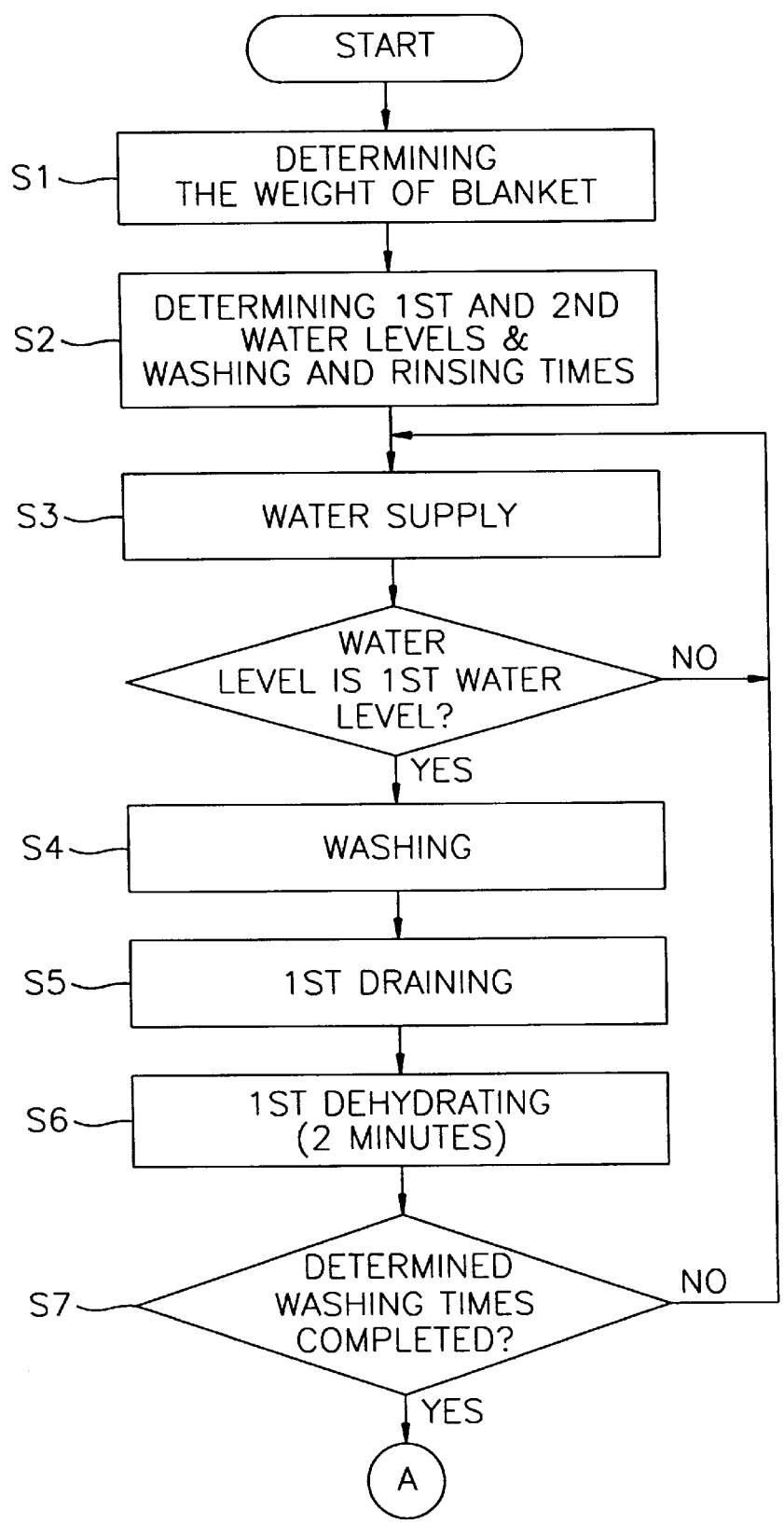
FIGS. 3A and 3B are flowcharts illustrating the method of washing a blanket in a washing machine according to a preferred embodiment of the present invention.
Figure 3B:
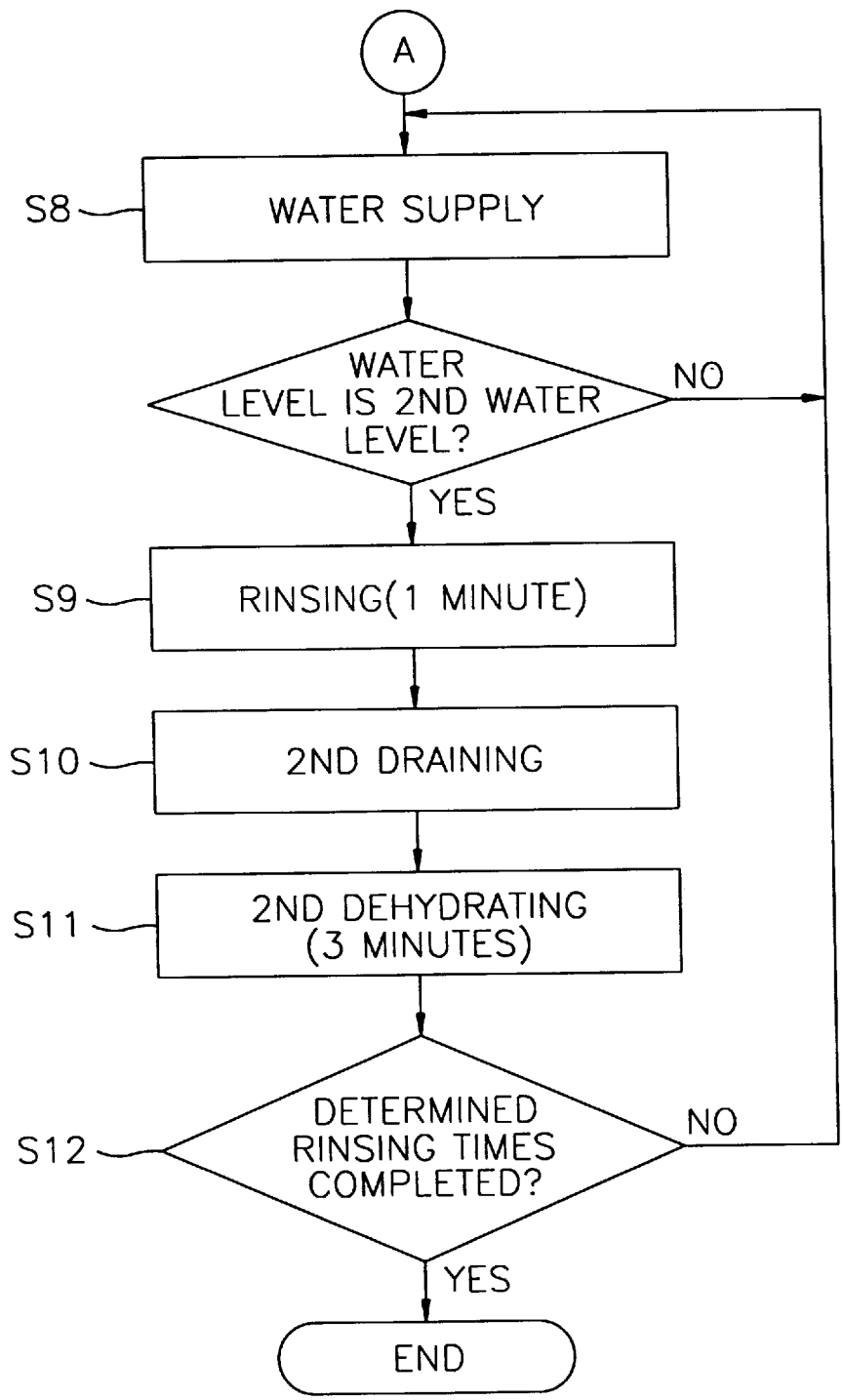
Figure 4:
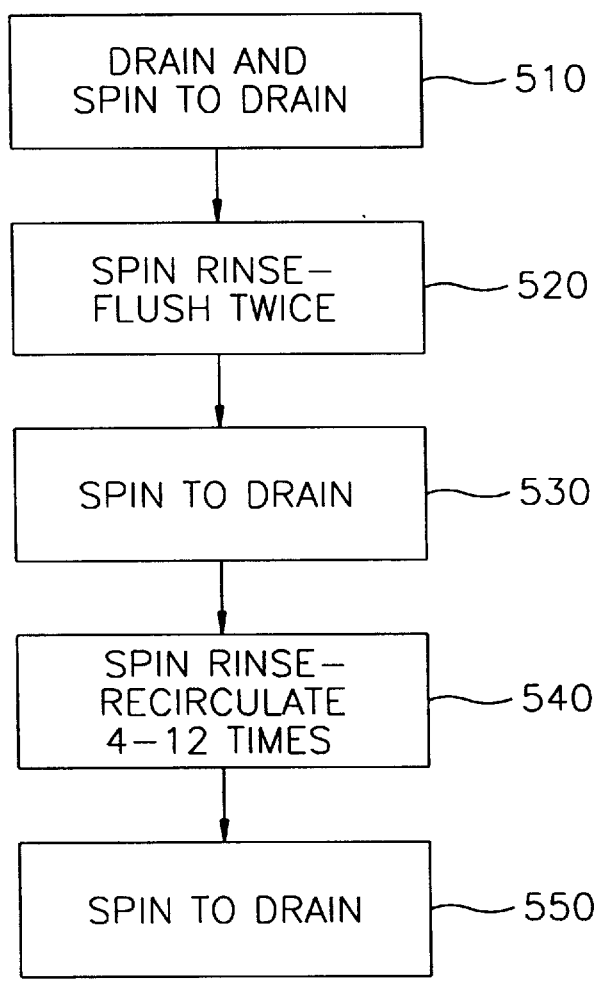
FIG. 4 is a flowchart illustrating a conventional spray rinsing method.

FIGS. 3A and 3B show flowcharts illustrating a method of washing a blanket in washing machine 200 according to a preferred embodiment of the present invention.

As shown in FIGS. 3A and 3B, when the user tosses a blanket to be washed into spin tub 220 of washing machine 200 and then pushes a power switch (not shown), washing machine 200 is initialized. Then, when the user pushes an operating switch (not shown), operating signal input section 310 sends an operating signal to control section 320. At this time, control section 310 detects a weight of the blanket in spin tub 220 by a following method. At first, control section 310 applies a predetermined power to motor 230 upon receiving the operating signal from operating signal input section 310 so as to rotate pulsator 270 mounted in a lower portion of spin tub 220. Preferably, the power applied to motor 230 is cut after one minute. Even though the power is cut, pulsator 270 continuously rotates by inertia. At this time, the weight of the blanket in spin tub 220 is determined according to a free rotation time lapse of pulsator 270 (step S1). That is, while pulsator 270 is freely rotating, the blanket charges its weight to pulsator 270. The longer the time lapse of the free rotation of pulsator 270, the lighter the weight of the blanket in spin tub 220. After control section 320 estimates the weight of the blanket, it determines first and second water supply levels which are water levels to be supplied during the washing and rinsing cycles respectively and the washing and rinsing times (step S2). In step S2, the first and second water supply levels and the washing and rinsing times are determined according to the weight of the blanket. Preferably, the rinsing times is determined to be 2 or 3 times.

Thereafter, control section 320 sends a washing water supply signal to water feeding/draining section 330 so as to supply the washing water into outer tub 210 (step S3). When the washing water level in outer tub 210 reaches the first water supply level, water level detecting section 340 sends an electric signal to control section 320. Then, control section 320 sends a washing water supply stop signal to water feeding/draining section 330. At the same time, control section 320 sends the operating signal to motor driving section 350 so as to rotate pulsator 270, thereby carrying out the washing cycle (step S4).

When the washing mode is finished, control section 320 sends a draining signal to water feeding/draining section 330 so as to open water draining pipe 280, and accordingly, the washing water in outer tub 210 is drained out of washing machine 200 through water draining pipe 280 (step S5) and then a first dehydrating mode starts (step S6). During the first dehydrating mode, spin tub 220 rotates by motor driving section 350 so as to generate a swirl flow, thereby separating a contaminated water permeated into the laundry from the laundry. According to a preferred embodiment of the present invention, the first dehydrating mode is carried out for approximately 2 minutes. The washing cycle including the washing, a first draining and the first dehydrating modes is repeated by the determined washing times (step S7). When the washing cycle is completed, a blanket rinsing cycle of the present invention starts.

As shown in FIGS. 3A and 3B, when the washing cycle is completed, a rinsing water is supplied up to the second water supply level which is lower than the first water supply level into outer tub 210. At this time, control section 320 sends a rinsing water supply signal to water feeding/draining section 330 and accordingly, the rinsing water is supplied into outer tub 210 (step S8). According to a preferred embodiment of the present invention, in step S8, the second water supply level is one level lower than the first water supply level in accordance with a memorized level scheme in washing machine 200. That is, the rinsing water is supplied up to the second water supply level. When the rinsing water level in outer tub 210 reaches the second water level, water level detecting section 340 sends an electric signal to control section 320. At the same time, control section 320 sends the operating signal to motor driving section 350 so as to actuate motor 230. A rotational force generated from motor 230 is transmitted to pulsator 270 through belt 250 and power transmission 240 so as to rotate pulsator 270, thereby starting the rinsing cycle (step S9).

According to a preferred embodiment of the present invention, in step S9, the rinsing mode is carried out for 1 minute. When the rinsing mode is finished, control section 320 sends the water draining signal to water feeding/draining section 330 so as to open water draining pipe 280 so that the rinsing water in outer tub 210 is drained out of washing machine 200 (step S10). Then, a second dehydrating mode starts. At this time, spin tub 220 rotates, the laundry in spin tub 220 urged toward a side wall of spin tub 220 by a centrifugal force and accordingly, the rinsing water permeated into the laundry is drained out of spin tub 220 through a plurality of apertures 222 formed at the side wall of spin tub 220 (step S11). The second dehydrating mode is carried out for a longer time than the first dehydrating mode, preferably approximately 3 minutes.

When steps S8 to S1 are repeated by the determined rinsing times, control section 320 stops the rinsing cycle. Thereafter, control section 320 carries out a main dehydrating cycle.

Although the preferred embodiment of the invention has been described, it is understood that the present invention should not be limited to this preferred embodiment, but various changes and modifications can be made by one skilled in the art within the spirit and scope of the invention as hereinafter claimed.

What is claimed is:

1. A method of washing a blanket in a washing machine having an outer tub for receiving washing water, a spin tub for receiving a laundry, a motor installed at an underside of the outer tub for generating a torque and transmitting the torque to a power transmission and a pulsator rotatably coupled to a rotating shaft of the power transmission, the method comprising the steps of:

(i) determining a weight of a blanket in the spin tub by rotating the pulsator by actuating the motor;

(ii) determining a first water supply level, a second water supply level, a washing times and a rinsing times according to the weight of the blanket;

(iii) supplying the washing water up to the first water supply level into the outer tub;

(iv) carrying out a washing mode when the washing water has been supplied up to the first water supply level into the outer tub;

(v) carrying out a first draining mode;

(vi) carrying out a first dehydrating mode for a first predetermined time period;

(vii) repeating steps (iv) to (vi) by the determined washing times;

(viii) supplying a rinsing water up to the second water supply level which is lower than the first water supply level by a predetermined level into the outer tub;

(ix) carrying out a rinsing mode for a second predetermined time period by rotating the pulsator when the rinsing water has been supplied up to the second water supply level into the outer tub;

(x) carrying out a second draining mode;

(xi) carrying out a second dehydrating mode for a third predetermined time period; and (xii) repeating steps (viii) to (xi) by the determined rinsing times.

2. The method as recited in claim 1, wherein step (i) comprises the substeps of (a) rotating the pulsator by actuating the motor by applying a predetermined power to the motor;

(b) stopping the applying of the power to the motor after a fourth predetermined time period lapses;

(c) detecting a time lapse of a free rotation of the pulsator by an inertia; and (d) evaluating the weight of the blanket according to the time lapse.

3. The method as recited in claim 2, wherein the fourth predetermined time period is approximately 1 minute.

4. The method as recited in claim 1, wherein in steps (iv) and (ix), a level of water, being supplied into the outer tub is detected by a water level detecting device which is installed at a predetermined position of a side wall of the outer tub and makes a U-shaped tube together with the outer tub, the water level detecting device sending an electric signal to a control section when a level of the washing water supplied in step (iii) reaches the first water supply level and when a level of the rinsing water supplied in step (viii) reaches the second water supply level.

5. The method as recited in claim 1, wherein the third predetermined time period is longer than the first predetermined time period.

6. The method as recited in claim 5, wherein the first predetermined time period is approximately 2 minutes.

7. The method as recited in claim 5, wherein the second predetermined time period is approximately 3 minutes.

8. The method as recited in claim 1, wherein in step (ix), the second predetermined time period is approximately 1 minute.

9. The method as recited in claim 1, wherein when step (xii) is finished, a main dehydrating cycle starts.

10. The method as recited in claim 1, wherein the third predetermined time period is longer than the first predetermined time period, the first predetermined time period being approximately 2 minutes and the second predetermined time period being approximately 3 is minutes.

* * * * *